United States Patent
Vass

(10) Patent No.: US 8,312,164 B2
(45) Date of Patent: Nov. 13, 2012

(54) MEDIA QUALITY ENHANCEMENT AMONG CONNECTED MEDIA COMMUNICATION DEVICES

(75) Inventor: Jozsef Vass, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 260 days.

(21) Appl. No.: 12/760,502

(22) Filed: Apr. 14, 2010

(65) Prior Publication Data

US 2011/0258338 A1 Oct. 20, 2011

(51) Int. Cl.
*G06F 15/16* (2006.01)
*H04N 7/26* (2006.01)

(52) U.S. Cl. .................. 709/233; 709/234; 709/235

(58) Field of Classification Search ........... 709/233, 709/231–232, 234–235, 246–247, 203–204; 370/230, 230.1, 231, 235, 465, 468; 375/240, 375/240.02, 240.03, 240.07
See application file for complete search history.

(56) References Cited

U.S. PATENT DOCUMENTS

| | | | | |
|---|---|---|---|---|
| 5,125,842 | A * | 6/1992 | Hiltunen | 433/226 |
| 7,543,073 | B2 * | 6/2009 | Chou et al. | 709/231 |
| 7,652,993 | B2 * | 1/2010 | van Beek | 370/231 |
| 7,843,818 | B2 * | 11/2010 | Chu et al. | 370/230 |
| 7,974,200 | B2 * | 7/2011 | Walker et al. | 370/235 |
| 2007/0097257 | A1 * | 5/2007 | El-Maleh et al. | 348/419.1 |
| 2007/0115814 | A1 * | 5/2007 | Gerla et al. | 370/230 |
| 2010/0158109 | A1 * | 6/2010 | Dahlby et al. | 375/240.03 |

OTHER PUBLICATIONS

"RTMP Specification License", Apr. 2009, Adobe Systems Incorporated, 70 pages.
Kaufman, Matthew, "RTMFP Overview for IETF77 TSV Area", 2009, Adobe Systems Incorporation , US, 57 pages.
McCanne et al., "Low-Complexity Video Coding for Receiver-Driven Layered Multicast", IEEE Journal on Selected Areas in Communications, Aug. 1997, 983-1001, 15(6), 19 pages.
Moser, Nelly, MultimediaWiki, retrieved Mar. 25, 2009, http://wiki.multimedia.cx/index.php?title=Nelly_Moser, 4 pages.
Ott et al., "RTP Control Protocol (RTCP) Extensions for Single-Source Multicast Sessions with Unicast Feedback", Internet Engineering Task Force (IETF) Request for Comments (RFC) 5760, Feb. 2010, 67 pages.
Singh, Kundan, "P2P-SIP, Peer-to-peer Internet telephony using SIP", Feb. 24, 2009, http://p2p-sip.blogspot.com/2006/02/email-based-identity-in-p2p-sip.html, 2 pages.

(Continued)

*Primary Examiner* — Wing Chan
*Assistant Examiner* — Ruolei Zong
(74) *Attorney, Agent, or Firm* — Fish & Richardson P.C.

(57) ABSTRACT

In one aspect, a method includes collecting, at a sending device, information including first information regarding an amount of encoded media data produced by a media encoder, and second information regarding an amount of encoded media data passed to, but not yet transmitted by, a transport layer network protocol stack; calculating, from the first information, an intermediate quantity of produced encoded media data, and from the first information and the second information, a rate of encoded media data transmission by the transport layer network protocol stack; and if the intermediate quantity compares favorably to a current media rate set for media data provided to the media encoder, increasing the current media rate by a rate adjustment amount, if the rate of encoded media data transmission compares unfavorably to the current media rate, decreasing the current media rate, else, maintaining the current media rate.

19 Claims, 5 Drawing Sheets

OTHER PUBLICATIONS

Schwartz, Benjamin M., "Re: [codec] layered encoding", http://www6.ietf.org/mail-archive/web/codec/current/msg00770.html, Apr. 14, 2010, 2 pages.

Valin, Jean-Marc, "The Speex Codec Manual Version 1.2 Beta 3", 2002-2007, Xiph.org Foundation, to be published by the USPTO, US, 65 pages.

Vass, Jozsef, "Re: [codec] updated charter proposal", http://www.ietf.org/mail-archive/web/codec/current/msg00769.html, Apr. 14, 2010, 11 pages.

Rosen, Brian, "Re: [codec] Conferencing and layering", http://www.ietf.org/mail-archive/web/codec/current/msg01065.html, Apr. 14, 2010, 2 pages.

* cited by examiner

MEDIA QUALITY ENHANCEMENT AMONG CONNECTED MEDIA COMMUNICATION DEVICES

BACKGROUND

This specification relates to programs executed in conjunction with media content generation.

The Internet is widely used to distribute media content, including video, graphic, audio, and scripting data. Media content can be downloaded as a file, or streamed to a client computer, where a media player application can process and output the media content to a display device and, if applicable, one or more speakers. The media player application or an application including media player functionality, in some examples, can be a program written for a particular operating system (OS) on a computer platform or a "plug-in" based software that runs inside another program, such as a runtime environment, on a computer platform.

Digital content can be shared directly between two devices, without an intervening central relay server, using a peer-to-peer (P2P) communication architecture where a participant provides a portion of resources (e.g., processor, memory, network bandwidth) to one or more additional participants. Peers generally create a sharing relationship, with each peer being both a consumer and a supplier of resources (e.g., digital content).

The rate at which media content is presented upon a user device can depend upon a number of factors, including the bandwidth and speed of the network connection, the processor speed of the receiving device, the processor load on the receiving device, and network congestion. If the processor is too slow, or the processor has too many applications vying for processing time at once, the frame rate of particular media content rendered upon the user device can slow to a frame rate which is too slow for the user to properly experience. For example, the media content can appear to be stalled or choppy.

Video quality or audio quality can be manually adjusted by a user to improve media presentation during network congestion or processor overload. For example, a user can reduce the video bit rate or video complexity (e.g., pixel density) through manual adjustment. Audio quality can be similarly adjusted by reducing the sampling rate or the quality level.

SUMMARY

This specification describes technologies relating to programs that are obtained and performed in conjunction with media content generation.

In general, one innovative aspect of the subject matter described in this specification can be embodied in methods that include the actions of collecting, at a sending device, information including first information regarding an amount of encoded video data produced by a video encoder, and second information regarding an amount of encoded video data passed to, but not yet transmitted by, a transport layer network protocol stack, calculating, from the first information, an intermediate quantity of produced encoded video data, and from the first information and the second information, a rate of encoded video data transmission by the transport layer network protocol stack, and when the intermediate quantity compares favorably to a current video rate set for video data provided to the video encoder, increasing the current video rate by a rate adjustment amount, when the rate of encoded video data transmission compares unfavorably to the current video rate, decreasing the current video rate, else, maintaining the current video rate. Other embodiments of this aspect include corresponding systems, apparatus, and computer programs, configured to perform the actions of the methods, encoded on computer storage devices.

These and other embodiments can each optionally include one or more of the following features. The actions can further include, when the current video rate is increased more than once, raising the rate adjustment amount, when the rate of encoded video data transmission compares unfavorably to the current video rate and the video rate was previously increased, lowering the rate adjustment amount, else, maintaining the rate adjustment amount. Moreover, decreasing the current video rate can include setting the current video rate to a value under the rate of encoded video data transmission, where the rate adjustment amount is lowered after the current video rate is decreased.

Collecting can be performed periodically in accordance with a first time interval, the calculating can be performed periodically in accordance with a second time interval that is at least five times longer than the first time interval, the current video rate can be a current video bit rate, and the intermediate quantity can be a moving average of the produced encoded video data. The transport layer network protocol stack can conform to a transport layer network protocol including a peer-to-peer connectivity feature, the actions further including: opening a peer-to-peer connection between the sending device and a first peer device, the peer-to-peer connection allowing a real-time video collaboration between the sending device and the first peer device, adding one or more additional peer devices to the real-time video collaboration, each additional peer device communicating with the sending device through an additional peer-to-peer connection, determining that a total number of peer devices exceeds a predefined number, and reconfiguring, based upon the determining, each peer-to-peer connection to use a client-server transfer mechanism.

The first information and the second information can be collected from a media player runtime environment through an application programming interface (API), the media player runtime environment providing a peer-to-peer connectivity feature through the transport layer network protocol stack, which includes a data prioritization feature that allows prioritization of audio data over video data, the transport layer network protocol stack having an associated audio data buffer and an associated video data buffer, the audio data buffer being separate from the video data buffer, and the produced encoded video data can include layered video.

Other innovative aspects of the subject matter described in this specification can be embodied in a computer storage medium encoded with a computer program including instructions that when executed by data processing apparatus cause the data processing apparatus to perform operations as described. In addition, a system can include an interface device, a network connection, and a computer coupled with the interface device and the network connection and programmed with a runtime environment including a media encoder, an audio data buffer and an video data buffer, the audio data buffer being separate from the video data buffer, and the runtime environment can be configured to enhance transmitted media quality based on input received in response to output provided regarding an amount of encoded video data produced by the media encoder and regarding an amount of encoded video data passed to the video data buffer but not yet transmitted. The interface device and the computer can be part of single consumer electronic device, such as a mobile telephone, a personal digital assistant (PDA), a mobile audio or video player, etc. Alternatively, the interface device and the computer can be divided among two or more distinct components, which can be locally connected or remotely connected by a network.

Particular embodiments of the subject matter described in this specification can be implemented so as to realize one or more of the following advantages. A peer-to-peer bandwidth enhancement scheme can be used to adjust media content quality or media transmission rate at a sender based upon the available bandwidth of a remote peer. By monitoring the drain rate of a transport layer network protocol stack, the available bandwidth of the remote peer can be determined. By matching the media content transmission rate to the available bandwidth of the remote peer, the remote peer enjoys lower latency and a better media content rendering experience than may be experienced using a default transmission rate. If a data prioritization scheme is used along with the bandwidth enhancement scheme, audio data can be provided with little or no latency even in times of congestion.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
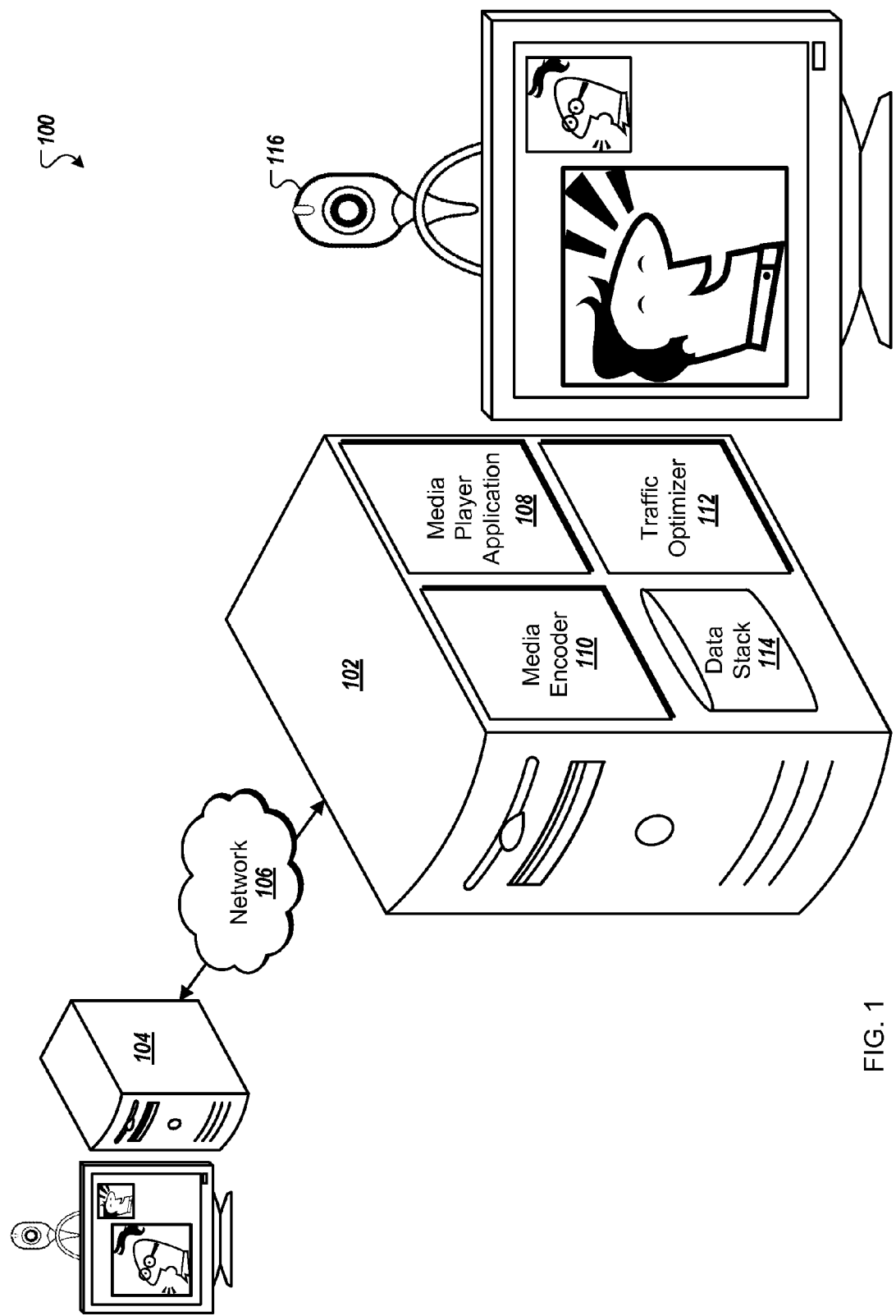
FIG. 1 is a block diagram of an example system for enhancing media quality between directly connected media player endpoints.

FIG. 1 is a block diagram of an example system 100 for enhancing media quality between directly connected media player endpoints. The media player endpoints, for example, can include a first peer computing device 102 communicating with a second peer computing device 104 over a network 106 using a media player application for video conferencing, including streaming audio and video data. The first peer computing device 102 can provide audio and video data directly to the second peer computing device 104, encoded by a peer-to-peer (P2P) media encoder 110. The first peer computing device 102 can automatically adjust the transmission rate of the media stream based upon the consumption rate of the second peer computing device 104, using a traffic optimizer 112, to enhance the experience of the user at the second peer computing device 104 without suppressing other network traffic. The traffic optimizer 112, for example, can provide information to a media player application 108, requesting a video bit rate (VBR) adjustment, video resolution adjustment, and/or audio quality adjustment to better match the perceived available bandwidth of the second peer computing device 104. In some implementations, the traffic optimizer 112 can trigger an adjustment which sends fewer of the video frames generated by the media player application 108, or which transmits a lower quality section of a layered video bit stream without the knowledge of the media player application 108. In some implementations, the traffic optimizer 112 or the media encoder 110 can apply data prioritization (e.g., audio over video) as well.

When the first peer computing device 102 and the second peer computing device 104 begin a video conferencing session, for example, the audio and video data (e.g., captured by a webcam 116 and microphone), can be encoded by the media encoder 110 to provide a P2P data connection between the two endpoints. The P2P protocol, in some examples, can be based upon the real-time transport protocol (RTP) or user datagram protocol (UDP) protocol standard. In some implementations, the P2P protocol is a version of the Real Time Media Flow Protocol (RTMFP), a protocol developed by Adobe Systems of San Jose, Calif. By transmitting via a P2P connection, the video conference session can enjoy higher bandwidth and lower latency than a typical client-server connection may achieve. During transmission, the traffic optimizer 112 can periodically collect statistics at a first time interval regarding the creation and consumption of data. Encoded data can be buffered for transmission to the second peer computing device 104, for example in a data stack 114. Based upon the rate at which the buffered encoded data is consumed by the second peer computing device 104, for example, the traffic optimizer 112 can provide the media player application 108 or the media encoder 110 with feedback to have the transmission rate of the media data adjusted accordingly.

Statistical analysis on the provision and consumption of encoded data, in some implementations, can include calculating a moving average over a second time interval which can be used to determine a quantity of media data (e.g., bytes) to send. This quantity can be determined, in part, upon a calculated drain rate of the data stack 114 (e.g., a comparison of the amount of data encoded versus an amount of data buffered). For example, if encoded data are not gathering in the data stack 114, the traffic optimizer 112 can request that the media player application 108 increase the video resolution, VBR, or audio output quality. If, instead, a considerable quantity of data is collecting in the data stack 114, the traffic optimizer 112 can request that the media player application 108 decrease the VBR or video resolution, or reduce audio output quality. To modify audio transmission bandwidth, in some examples, using the Speex audio compression codec, the Speex audio rate can be changed by specifying a quality parameter, or, using the Nellymoser Asao codec, the Nellymoser audio rate can be changed by specifying a different codec sampling frequency.

The amount by which the data transmission rate is adjusted, in some implementations, can depend in part upon whether or not the data transmission rate was previously adjusted. For example, if the data transmission rate was previously upwardly adjusted, and the traffic optimizer 112 determines that additional bandwidth can be allocated towards the video conferencing session, the rate adjustment amount can be raised. For example, raising the rate adjustment can allow the transmission rate to more quickly converge on an enhanced or optimized rate. On the other hand, if the data transmission rate was previously upwardly adjusted, and the traffic optimizer 112 determines that the current transmission rate is higher than the second peer computing device 104 can consume, the transmission rate can be decreased. For example, based upon the current average consumption rate of the second peer computing device 104, the rate adjustment amount can be set to achieve a transmission rate corresponding to approximately a percentage of the current data stack drain rate (e.g., eighty percent, ninety percent., etc.). The transmission rate, in another example, can be reduced to the previous "good" rate (e.g., by the same rate adjustment amount as previously used to increase). In some implementations, the rate adjustment amount for raising the transmission rate can differ from the rate adjustment amount for lowering the transmission rate. For example, the transmission rate may be lowered more aggressively than it is raised.

Although the system 100 includes two peer computing devices 102, 104, in some implementations, a P2P connection can be created between the first peer computing device 102 and two or more additional peer computing devices. In some implementations, each additional peer computing device can receive media data at a data transmission rate enhanced to provide the lowest bandwidth peer with an adequate media consumption experience. The total bandwidth availability per peer, for example, can depend upon the uplink bandwidth allocated between the first peer computing device 102 and the additional peer computing device, since the uplink bandwidth is often significantly lower than the downlink bandwidth. Each additional peer computing device, in some implementations, can be allocated a separate network socket and separate transmission queues in the data stack 114. In this example, the data transmission rate can be separately enhanced for each additional peer computing device.

Figure 2:
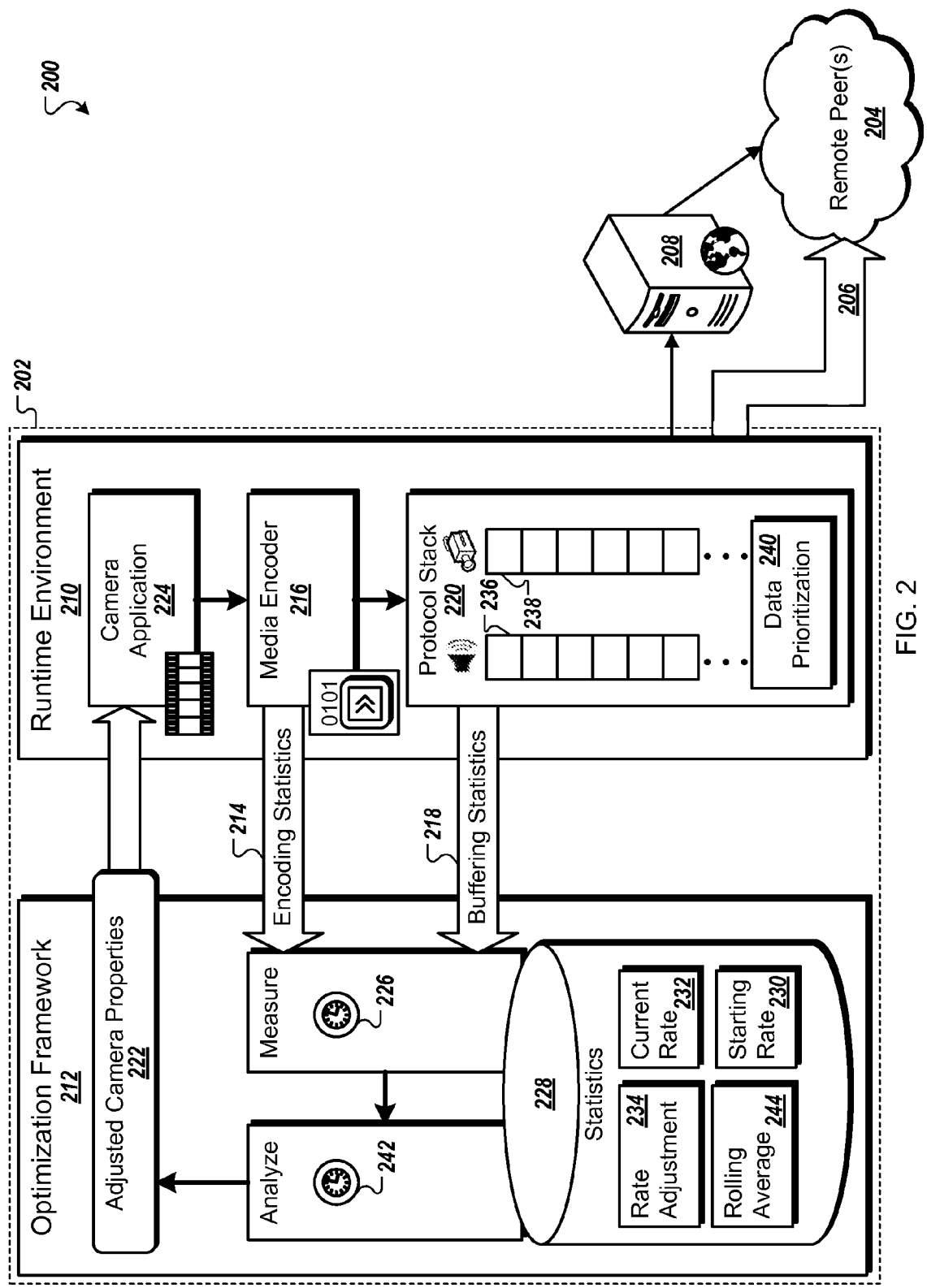
FIG. 2 is an example architecture of a media player endpoint.

FIG. 2 is an example architecture 200 of a media player endpoint 202. The media player endpoint 202 can participate in streaming media sharing with one or more remote peers 204 using either a point-to-point communication path 206 or relaying communications through a central relay server 208. The communications method, for example, can be determined based in part upon the number of remote peers 204 participating in the streaming media connection. In addition, in some implementations, the central server 208 can function as a coordinator among the various endpoints, including facilitating the initial set up of P2P communications.

The media player endpoint 202 includes a runtime environment 210 for encoding and transmitting streaming media data and an optimization framework 212 for collecting and analyzing transmission rate statistics and adjusting the transmission rate of the streaming media data accordingly. The runtime environment 210, for example, can provide the optimization framework 212 with both encoding statistics 214 related to the quantity of data encoded by a media encoder 216 and buffering statistics 218 related to the quantity of data buffered by a protocol stack 220. The optimization framework 212 can collect and analyze the statistics 214 and 218 and provide one or more adjusted camera properties 222 to a camera application 224 executing on the runtime environment 210.

When the media player endpoint 202 enters into a P2P communication session with a first remote peer 204, the media player endpoint 202 can receive a bandwidth allocation declaration (e.g., from the server 208 or another network server). The bandwidth allocation can be used as a basis for establishing an initial media transmission rate, or the transmission can be initialized to a default rate. The initial media transmission rate can be provided to the optimization framework 212, where it can be stored in a statistics data store 228 as a starting rate 230. A current rate 232 can similarly be initialized to the value of the starting rate 230. A rate adjustment amount 234 can be initialized to an initial rate adjustment amount, for example as a percentage of the starting rate 230 or a default value, such as 200 kilobits per second (kbps) or 500 kbps.

The camera application 224 can begin to generate video frames at a video quality and/or frame rate determined based upon the initial media transmission rate. The individual media frames generated by the camera application 224, in some implementations, can vary in size from frame-to-frame, depending in part upon whether a particular frame is a key frame. As such, the media data provided to the media encoder 216 can exhibit burstiness rather than a smooth data rate generated by similar-sized frames.

The media encoder 216 can encode the media data as P2P transmission packets. The total quantity of data encoded (e.g., bits, bytes, words, etc.), as well as the total number of data packets encoded, can be collected by the media encoder 216 as encoding statistics 214. In some implementations, a runtime environment class specifies various Quality of Service (QOS) statistics related to a streaming buffer for audio, video, and data. The P2P protocol transport layer, in some implementations, includes a QOS reporting mechanism including statistics related to the quantity of data encoded and the quantity of data pending transmission in a transmit buffer.

The optimization framework 212 can sample the encoding statistics 214 on a set statistics collection schedule 226 describing a first time interval. The statistics collection schedule 226, for example, can be set to a number of milliseconds (e.g., 50 ms, 200 ms, 400 ms, etc.). In some implementations, the statistics collection schedule 226 is based upon the video frame rate. For example, the statistics collection schedule 226 can be set to an integer multiple of the video frame rate, as generated by the camera application 224. The statistics can be stored in the statistics data store 228. In some implementations, the encoding statistics 214 are sampled through an application programming interface (API). If the statistics are provided through an API library, for example, network condition events can be exposed to the optimization framework 212 as well, so that the optimization framework 212 can provide adjusted camera properties 222 based, in part, upon the current network state.

The encoded media data can be buffered for transmission in the protocol stack 220 in an audio buffer 236 or a video buffer 238, as appropriate. The runtime environment 210 can provide the optimization framework 212 with buffering statistics 218 regarding the amount of data accumulated in the video data buffer 238 and, optionally, the audio data buffer 236, for example on the statistics collection schedule 226.

In some implementations, a data prioritization scheme 240 can be applied to the buffered data, for example to prioritize audio data in the audio buffer 236 so that adequate audio quality can be provided to the remote peer(s) 204 during times of network congestion or substantial video packet buffering. For example, during traffic congestion, video latency or video loss can occur, while audio loss can be kept to a minimum.

The data collected in the protocol stack 220 can be provided to the remote peer(s) 204 on a consumption basis. For example, the remote peer(s) 204 can set the transmission rate of the data from the protocol stack 220 based upon ability to consume the data provided. If the remote peer(s) 204 have difficulty consuming data at the starting rate 230, data can accumulate in the protocol stack 220.

To avoid data accumulation, the optimization framework 212 can set a statistics analysis schedule 242 on a second time interval at which the optimization framework 212 calculates a peer consumption rate (or protocol stack drain rate) based upon the amount of data accumulated in the protocol stack 220 compared to the amount of data encoded by the media encoder 216. The optimization framework 212 can perceive an estimated available bandwidth at the remote peer based upon the drain rate, for example, by subtracting the buffered data from the total data generated. The consumption rate can be collected within a rolling average 244. The rolling average 244, for example, can include the previous several seconds of consumption rate calculations. The statistics analysis schedule 242, for example, can be set to an integer multiple of the statistics collection schedule 226 (e.g., three times, five times, or ten times, etc.).

In some implementations, the optimization framework 212 collects encoding statistics 214 and buffering statistics 218 at a statistics collection schedule 226 of every 200 milliseconds and calculates the consumption rate at a statistics analysis schedule 242 of approximately once every second (e.g., every fifth collection period). The rolling average 244 can collect, for example, the ten most recent consumption rate calculations.

Upon each statistics analysis schedule 242 period, the optimization framework 212 can also analyze the consumption rates collected within the rolling average 244 to determine whether the remote peer 204 is keeping up with the current rate 232 and, if so, if the transmission rate may be adjusted by the rate adjustment amount 234. If the remote peer 204, instead, appears to be falling behind the current rate 232, the optimization framework 212 can determine whether to decrease the transmission rate by the rate adjustment amount 234 to alleviate accumulation of encoded data within the protocol stack 220.

If the optimization framework 212 determines that the remote peer 204 may benefit from a modification of transmission rate, the optimization framework 212 provides adjusted camera properties 222 to the runtime environment 210. The adjusted camera properties 222, for example, can include an adjusted VBR for video data generation, video quality modifications, audio quality modifications, or other media capture adjustments which, when enabled by the camera application 224, can change the quantity of data provided to the media encoder 216 for transmission. The optimization framework 212 can additionally store the new transmission rate in the current rate 232. In some implementations, the optimization framework 212 also tracks the number of times the transmission rate has been adjusted and in which directions (e.g., raised or lowered). The optimization framework 212, in some implementations, may instead derive the upward or downward modification to the rate adjustment amount based upon the difference between the starting rate 230 and the current rate 232.

In some implementations, rather than providing adjusted camera properties 222 to the camera application 224, the optimization framework 212 can provide an adjusted data encoding rate to the media encoder 216. If, for example, the runtime environment 210 has no input into the functionality of the camera application 224, the media encoder 216 can instead throttle the amount of data provided to the protocol stack 220 by discarding a portion of the video frames generated by the camera application 224 (e.g., dropping every Nth frame to match the buffer drain rate).

If another remote peer 204 is later added to the P2P connection 206, the allocated bandwidth can be shared between the two remote peers 204. In this manner, a smaller total bandwidth is available to each remote peer. In some implementations, the optimization framework 212 determines a new starting rate 230 for the shared P2P connection 206.

In some implementations, separate protocol stacks 220 can be allocated to each of the remote peers 204, while both protocol stacks are fed by the same media encoder 216. If the media encoder 216 encodes a layered bit stream, the media encoder 216 can provide a different quality level to each remote peer 204 depending upon the consumption capabilities of each of the remote peers 204. For example, if the first remote peer 204 is connected to the media player endpoint 202 by a local area network (LAN) connection, while the second remote peer 204 is connected to the media player endpoint 202 by a home Integrated Services Digital Network (ISDN) connection, the first remote peer 204 can be provided with the enhanced quality video data and wide-band audio, and the second remote peer 204 can be provided with basic quality video data and narrowband audio, both data provided at the same frame rate. If the media encoder 216 does not encode a layered bit stream, the optimization framework 212 can work with the runtime environment 210 to determine a "lowest common denominator" transmission rate which is adequate for both the first and second remote peers 204.

In some implementations, separate media encoders 216 can be allocated in addition to separate protocol stacks 220. In this manner, each of the media encoders and protocol stacks can behave in a similar manner as described above in the single remote peer scenario, while the optimization framework 212 can track separate statistics for each of the remote peers 204.

At some point, while remote peers 204 are added to the P2P connection 206, the allocated bandwidth can become too fragmented to provide adequate quality to the remote peers 204. In some implementations, the runtime environment 210 can automatically tear down each P2P interface between each remote peer 204 and the media player endpoint 202 and switch the connections to the central relay server 208. The central relay server 208 can continue to handle the traffic as long as the threshold number of remote peers 204 is in communication with the media player endpoint 202. If one or more of the remote peers 204 drop the connection with the media player endpoint 202, in some implementations, the media player endpoint 202 can revert back to the P2P connection 206.

Figure 3:
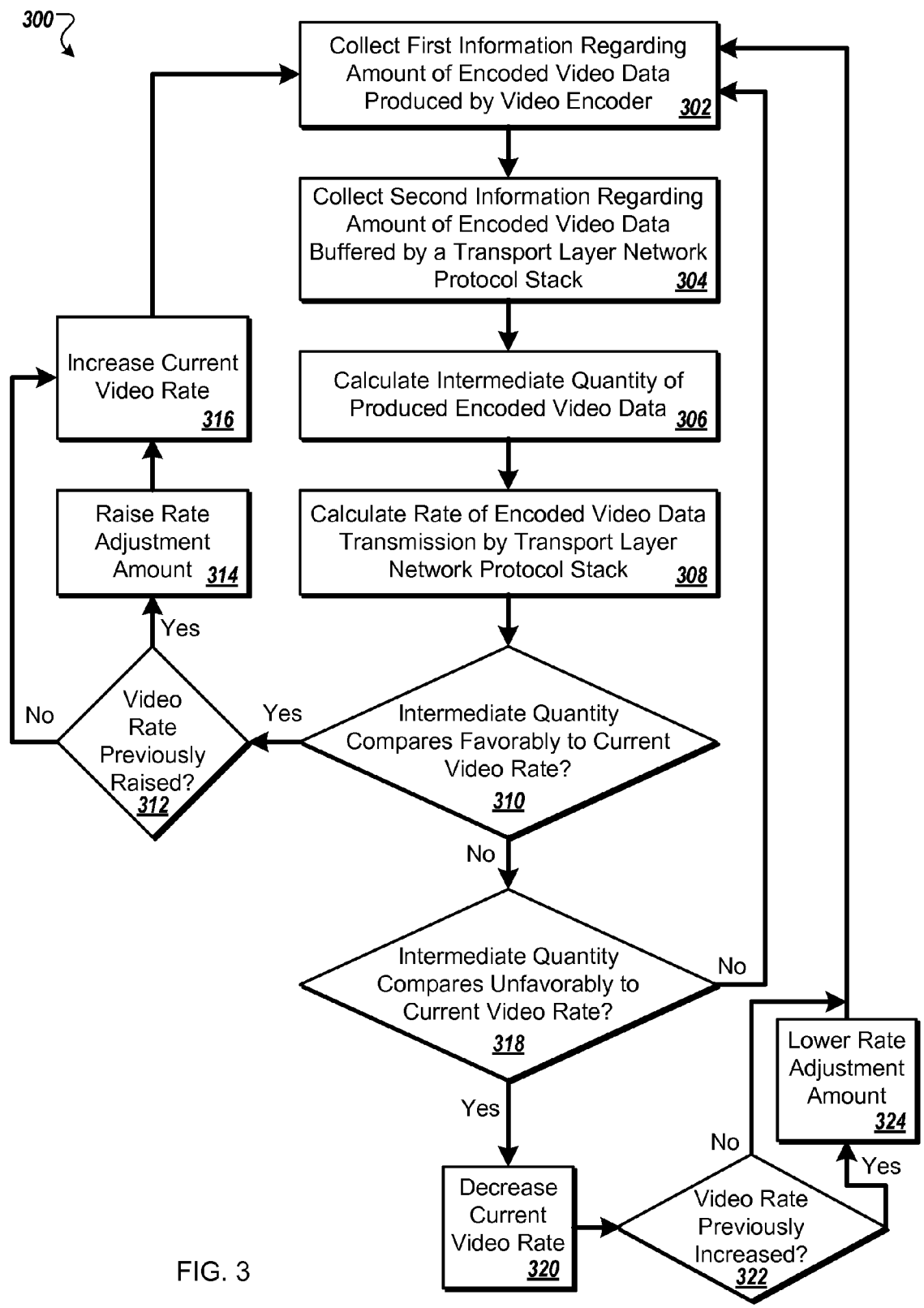
FIG. 3 is a flow chart of an example process for enhancing media quality between directly connected media player endpoints.

FIG. 3 is a flow chart of an example process 300 for enhancing media quality between directly connected media player endpoints. The process 300, for example, can be performed by the optimization framework 212, as described in relation to FIG. 2. As an overview, the process 300 describes collecting statistics regarding encoded video data generated for transmission to a remote peer. The statistics can be analyzed to adjust the transmission rate of the encoded video data to better match the consumption abilities of the remote peer.

The process 300 begins with collecting first information regarding an amount of encoded video data produced by a video encoder (302). The amount of encoded video data, for example, can be reported as a number of bytes received from a camera application by a media encoder and encoded into packets, or as a number of encoded packets received by a network protocol stack from a media encoder.

Second information regarding an amount of encoded video data passed to, but not yet transmitted by, a transport layer network protocol stack is collected (304). For example, the encoded video data can accumulate in a video data buffer of the protocol stack. The second information, in some implementations, can be reported as a number of bytes buffered for transmission to a peer computing device. In some implementations, a number of packets buffered or a percentage of buffer space utilized can additionally (or alternatively) be collected.

The first and second information, for example, can be collected periodically on a first time interval; the information stored in a collection of data points which can be analyzed on a second time interval. The first information and the second information, in some implementations, can be derived from statistics collected by the particular protocol standard. The statistics, in some implementations, are standard statistics collected by a runtime in which the media encoder executes. The first information and the second information, for example, can be retrieved through a runtime API.

An intermediate quantity of produced encoded video data is calculated (306). A rolling average, for example, of the quantity of produced encoded video data can be used to determine an average video data production rate over the second time interval.

A rate of encoded video data transmission by the transport layer network protocol stack is calculated (308). By comparing the average production rate of encoded video data to the average amount of encoded video data collected in the protocol stack, an average transmission rate (e.g., the encoded video data that has been shared with the remote peer) can be derived. The average transmission rate, for example, suggests a consumption ability of the remote peer.

If the intermediate quantity compares favorably to the current video rate (310), the process 300 increases the current video rate (316). For example, if little or no encoded video data has accumulated in the protocol stack, the remote peer may be able to accept a higher data transmission rate. For example, if less than ten percent of encoded video data has been accumulating in the protocol stack, the drain rate may be considered to be favorable for a transmission rate increase. For example, based upon a five hundred kbps encoding rate, a maximum of fifty kilobits may be accumulated at a given time.

In some implementations, the calculation can be based upon a percentage of the frame rate. For example, a favorable quantity can correlate to no more than one hundred milliseconds of data accumulating, based upon a thirty frames per second (fps) frame rate. Taking this example from the view of total number of frames, a maximum of three frames may be buffered at any one time, based upon a thirty fps frame rate.

In addition, before increasing the current video rate, the process 300 can determine whether the video transmission rate was previously raised (312). If the video transmission rate was previously raised (312) the transmission rate adjustment amount is increased (314). For example, if the remote peer has handled the previous transmission rate increase, the remote peer may be capable of handling substantially more data. The increment at which the transmission rate was increased can be adjusted to better accommodate the end user experience at the remote peer. In some examples, the transmission rate adjustment amount can be incremented by a scalar quantity (e.g., 100 kbps) or a percentage of the current transmission rate. Whether or not the rate adjustment amount is modified, the current video rate is increased (316). In some implementations, a media player application can be instructed to increase video output quality or to increase VBR. If the media encoder encodes layered video data, in some implementations, the media encoder can be instructed to provide a higher quality layer of encoding to the remote peer. After making a modification to the video data transmission rate, the process 300 returns to collecting first information regarding the amount of encoded video data (302).

Returning to stage (310), if the intermediate quantity did not compare favorably to the current video rate, the process 300 determines whether the intermediate quantity compares unfavorably to the current video rate (318). For example, the amount of encoded data buffered in the protocol stack can be compared to a threshold number of bytes or packets. If the comparison is within an acceptable range, the process 300 returns to collecting first information regarding the amount of encoded video data (302). For example, the process can determine that the current transmission rate is in good balance with the consumption abilities of the remote peer. An average of between ten and twenty percent accumulation within the protocol stack, for example, may be considered to be indicative of the transmission rate being in good balance with the available bandwidth.

In some implementations, the calculation can be based upon a percentage of the frame rate. For example, a favorable quantity can correlate to between one hundred and two hundred milliseconds of data accumulating, based upon a thirty fps frame rate. Taking this example from the view of total number of frames, a maximum of six frames may be buffered at any one time, based upon a thirty fps frame rate. Additionally, in some examples, the process 300 can monitor the average number of buffered frames (e.g., no more than three or four on average).

If, instead, an unfavorable comparison has been found, the current video transmission rate is decreased (320). In some implementations, a media player application can be instructed to decrease video output quality or to decrease VBR. If the media encoder encodes layered video data, in some implementations, the media encoder can be instructed to provide a lower quality layer of encoding to the remote peer. For example, if greater than twenty percent of encoded video data has been accumulating in the protocol stack, a transmission rate decrease may be determined to be beneficial.

In some implementations, if the comparison is found to be highly unfavorable (e.g., there is a network overrun), the transmission rate can be temporarily set to much lower than the estimated protocol stack drain rate. For example, to allow the accumulated video data to drain down, the transmission rate can be reassigned to seventy-five percent of the calculated protocol stack drain rate. During network overrun, the transmission rate, in some implementations, can be reset to a transmission rate which had been previously determined to be beneficial (e.g., the transmission rate prior to a rate increase), rather than being adjusted by the rate adjustment amount.

In addition, after decreasing the current video rate, the process 300 can determine whether the video transmission rate was previously increased (322). For example, the previously applied rate adjustment amount may have been too aggressive, overshooting the consumption capacity of the remote peer. If so, the rate adjustment amount is lowered (324). In some implementations, the rate adjustment amount is lowered by a percentage amount by which it was previously raised. The rate adjustment amount, in some implementations, can be reset to an initial rate adjustment amount or decreased by the same amount by which it was previously raised. After making the adjustment in transmission rate and, optionally, the rate adjustment amount, the process returns to collecting first information regarding the amount of encoded video data (302).

In some implementations, the rate adjustment amount can be decreased prior to lowering the transmission rate. For example, to fine tune the adjustment of the current video rate to best match the consumption capacity of the remote peer, the current video rate can be decreased by a smaller amount, corresponding to a decreased rate adjustment amount.

Figure 4:
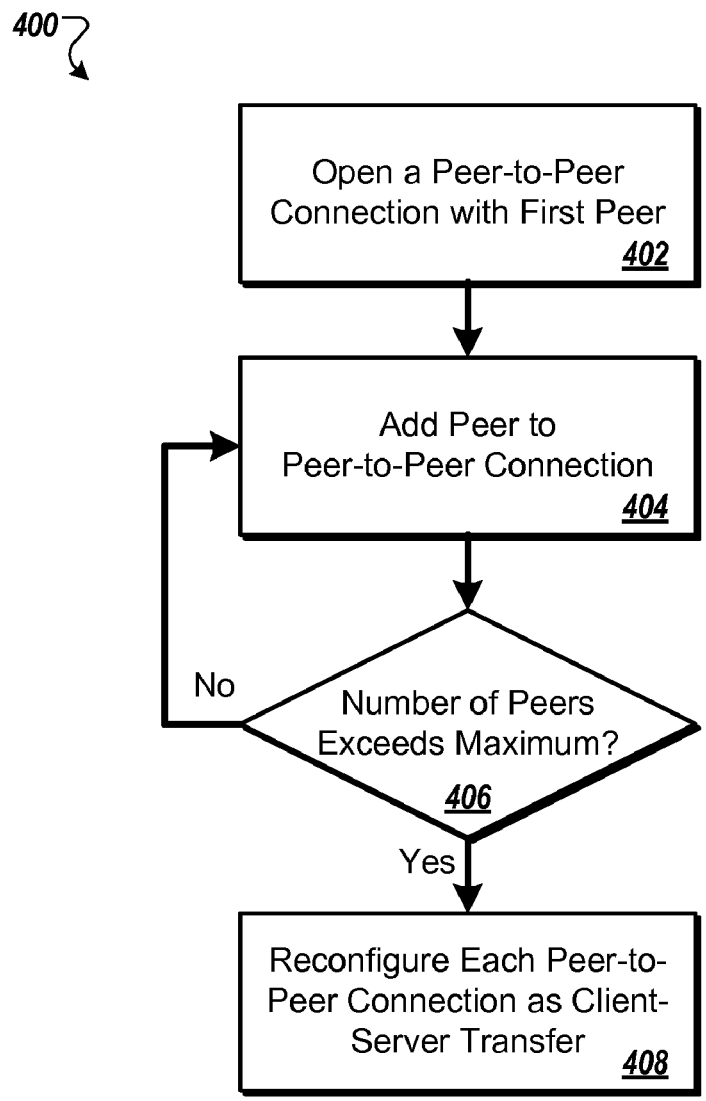
FIG. 4 is a flow chart of another example process for enhancing media quality between media player endpoints.

FIG. 4 is a flow chart of an example process 400 for enhancing media quality between media player endpoints by switching protocol transfer mechanisms between a peer-to-peer transfer and a client-server transfer based upon the number of peers actively sharing in realtime streaming media. For example, during a video conferencing session, the network connection used to communicate between the various media player endpoints can change depending upon the number of participants in the video conferencing session.

The process 400 begins by opening a peer-to-peer connection with a first peer computing device (402). The connection, for example, can include a point-to-point streaming media connection such as a video conferencing application.

As long as the number of peers does not exceed a maximum threshold (406), additional peers are added to the peer-to-peer connection (404). The maximum threshold, in some implementations, can be determined by the bandwidth available for the peer-to-peer connection. For example, with each additional peer, the P2P bandwidth allocation is split between participants. When the P2P bandwidth allocation becomes too small to provide an adequate end user experience for each participant, the threshold has been reached.

In some implementations, the maximum threshold can be a default number of participants. For example, the bandwidth provided to each participant may be identical, based upon a lowest common denominator consumption rate amongst the participants. The maximum threshold, in some implementations, can be based upon the number of participants receiving each level of service, if different layered bit stream quality levels are provided based, for example, upon each participant's processing capabilities or network connection type. For example, a given P2P connection may be capable of servicing two remote peer computing devices at an enhanced quality rate or four remote peer computing devices at a basic quality rate. As another example, the peer-to-peer communications can be switched to the client-server architecture when more than three clients are participating.

When the maximum threshold of peers has been reached (406), each peer-to-peer connection is reconfigured as a client-server transfer (408). The P2P transfer mechanism between the endpoint on which the process 400 is executing and each remote participant can be shut down, and a client-server transfer mechanism constructed in its place. In some implementations, rather than accepting the additional peer and reconfiguring the connections, the process 400 can deny the addition of the new peer. For example, certain system configurations, such as certain cloud computing configurations, may not provide an opportunity for server-relayed media. By blocking the addition of more than a threshold number of peers, the system can continue to provide peer-to-peer media sharing.

Figure 5:
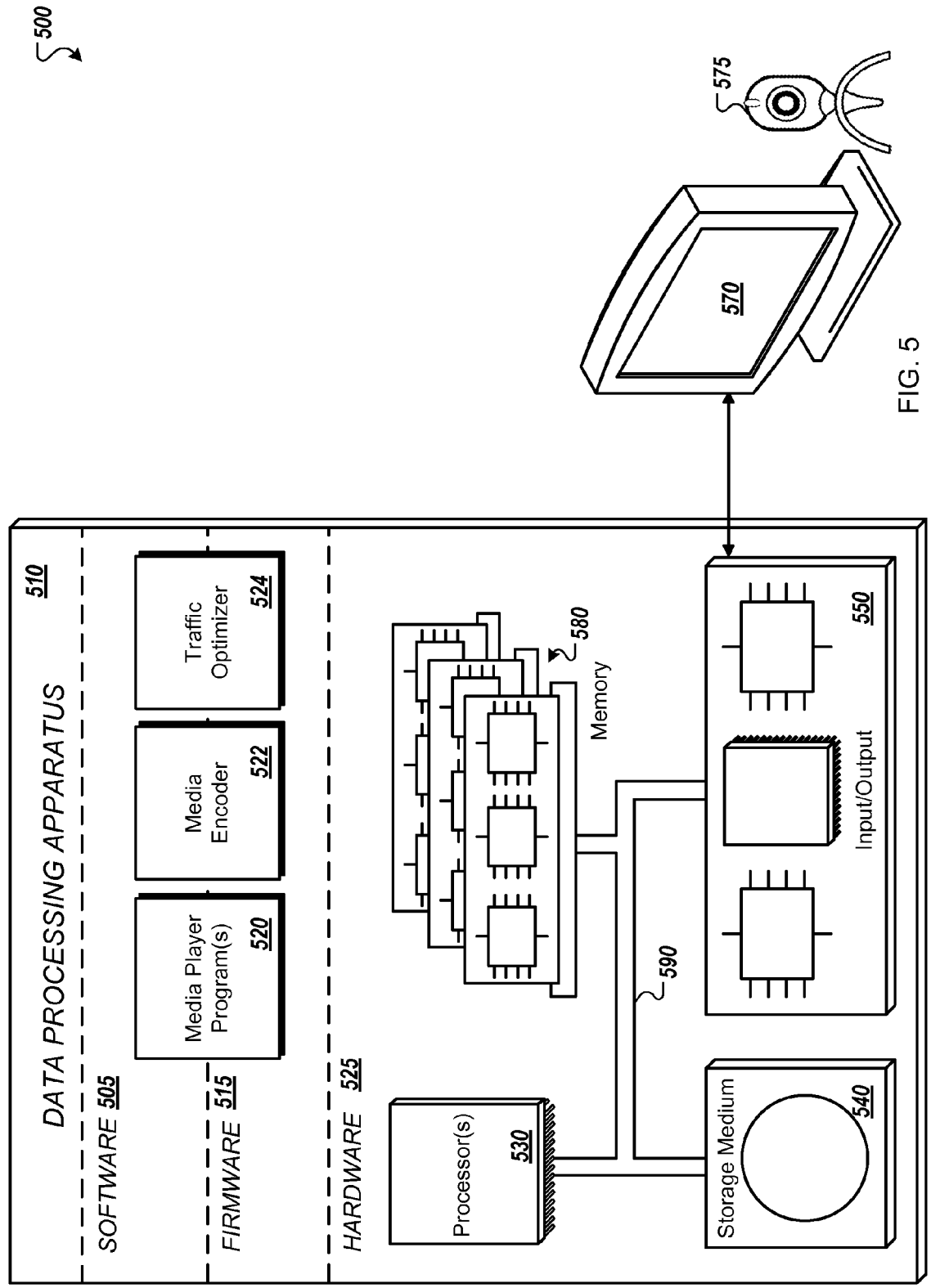
FIG. 5 is a block diagram of an example apparatus for performing media quality enhancement between directly connected media player endpoints.

FIG. 5 is a block diagram of an example apparatus 500 for performing media quality enhancement between directly connected media player endpoints. A data processing apparatus 510 can include hardware 525, firmware 515 and software 505, and can include one or more media player program(s) 520, a media encoder 522, and a traffic optimizer 524 operating in conjunction with the data processing apparatus 510 to effect various operations described in this specification. The media player program(s) 520, media encoder 522, and traffic optimizer 524, in combination with the various hardware 525, firmware 515, and software 505 components of the data processing apparatus 510, represent one or more structural components in the system 500, in which the algorithms described herein can be embodied.

The media player program(s) 520 can be one or more applications for inputting, processing, and/or outputting media content (e.g., audio, video, graphical, and/or textual data). The media player program(s) 520 can input media information from a camera device 575 and, optionally, a microphone device. The media player program(s) 520 can output media information to one or more output devices such as a display device 570 and, optionally, one or more speakers. An application refers to a computer program that the user perceives as a distinct computer tool used for a defined purpose. An application can be built entirely into an operating system or other operating environment, or it can have different components in different locations (e.g., a remote server). The media player program(s) 520 can include or interface with other software. The media player program(s) 520 can include a stand alone media player program, a media player program that relies on a runtime environment to operate (e.g., a Java® virtual machine or an Adobe AIR® runtime environment), or multiple different media player programs, which can be stand alone, browser-based, or runtime environment-based, in some examples.

Interface software can also be included that operates over a network to interface with other processor(s), such as in a computer used by a remote peer communicating with the data processing apparatus 510 in a video conferencing session. For example, the media encoder 522 can include software methods for transmitting media data to another computer accessible over a network, using a peer-to-peer data connection to reach a remote peer computing device.

The traffic optimizer 524 can interface between the media encoder 522 and the media player programs 520, or otherwise work in tandem with the media encoder 522 and, optionally, the media player program(s) 520 to enhance media quality at a peer computing device during a streaming media session.

The hardware level 525 of the data processing apparatus 510 includes one or more processors 530, a memory 580, and at least one computer-readable medium 540 (e.g., random access memory, storage device, etc.). The hardware level 525 can also include one or more input/output devices 550, including one or more user interface devices.

Each of the components 530, 540, 550, and 580 are interconnected using a system bus 590. The processor(s) 530 can process instructions for execution within the system 500. In some implementations, one or more single-threaded processors can be included within the processor(s) 530. In other implementations, one or more multi-threaded processors can be included within the processor(s) 530. In some implementations, the processor(s) 530 can process instructions stored in the memory 580, or on the storage device 540, to display graphical information on the display device 570.

The memory 580 can be a computer-readable medium used to store information within the system 500 and can include a volatile memory unit, a non-volatile memory unit, or both. The storage device 540 can provide mass storage for the system 500. The storage device 540 can include a floppy disk device, a hard disk device, an optical disk device, or a tape device.

The input/output devices 550 provide input/output operations for the system 500. The input/output devices 550 can include a keyboard, mouse, stylus or pointing device, a display unit for displaying graphical user interfaces such as the display device 570, a camera such as the camera device 575, a modem or other networking hardware/firmware, or any combination thereof to name a few examples.

The subject matter described in this specification can also be used in conjunction with other input/output devices, such as a printer or scanner. An input/output device can be used to connect to a network, and can furthermore connect to one or more processors via the network (e.g., the Internet).

Therefore, a user of the media player program(s) 520, media encoder 522, or traffic optimizer 524 does not need to be local, and may be connecting in a wired or wireless fashion using an internet or intranet connection on a personal computer, personal digital assistant (PDA), smartphone (e.g., a cellular phone including an operating system and advanced computing capabilities), or using other suitable hardware and software at a remote location. For example, a user can access a web interface via a remote processor in order to engage in a video conferencing session. In any event, data can be transmitted over the network to/from the data processing apparatus 510. Note that the data processing apparatus 510 can itself be considered a user interface device (e.g., when the media player program(s) 520 or the traffic optimizer 524 is delivered by a remote server as a web service).

The system 500 can be used to generate and provide frame-based media content to a remote peer over a P2P data communication transmission while dynamically adjusting the transmission rate based upon a perceived consumption capacity of the remote peer computing device. For example, during generation of media data by the media player program(s) 520, first information regarding an amount of encoded video data produced by the media player program(s) 520 and second information regarding an amount of encoded video data passed to a transport layer network protocol stack by the media encoder 522 can be collected by the traffic optimizer 524 and temporarily stored within the memory 580, on a statistics collection schedule based upon, for example, a system clock value maintained by the system 500 (e.g., processor clock output). The media content can be transmitted to a peer computing device connected to the data processing apparatus 510 via a network connection. Based upon analysis of the collected statistics, the traffic optimizer 524 can adjust the transmission rate of the media content to better meet the consumption capability of the peer computing device or to alleviate network congestion.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    collecting periodically in accordance with a first time interval, at a sending device, information including
        first information regarding an amount of encoded video data produced by a video encoder, and
        second information regarding an amount of encoded video data passed to, but not yet transmitted by, a transport layer network protocol stack;
    calculating periodically in accordance with a second time interval, which is different from the first time interval,
        from the first information, an intermediate quantity of produced encoded video data, and
        from the first information and the second information, a rate of encoded video data transmission by the transport layer network protocol stack; and
    when the intermediate quantity compares favorably to a current accumulation of encoded video data in the transport layer network protocol stack,
        increasing a current video rate by a rate adjustment amount,
    when the rate of encoded video data transmission compares unfavorably to the current video rate,
        decreasing the current video rate,
    else,
        maintaining the current video rate.

2. The method of claim 1, further comprising:
    when the current video rate is increased more than once,
        raising the rate adjustment amount,
    when the rate of encoded video data transmission compares unfavorably to the current video rate and the video rate was previously increased,
        lowering the rate adjustment amount,
    else,
        maintaining the rate adjustment amount.

3. The method of claim 2, where decreasing the current video rate comprises setting the current video rate to a value under the rate of encoded video data transmission, and where the rate adjustment amount is lowered after the current video rate is decreased.

4. The method of claim 2, where the second time interval is at least five times longer than the first time interval, the current video rate is a current video bit rate, and the intermediate quantity is a moving average of the produced encoded video data.

5. The method of claim 2, where the transport layer network protocol stack conforms to a transport layer network protocol including a peer-to-peer connectivity feature, the method further comprising:
    opening a peer-to-peer connection between the sending device and a first peer device, the peer-to-peer connection allowing a real-time video collaboration between the sending device and the first peer device;
    adding one or more additional peer devices to the real-time video collaboration, each additional peer device communicating with the sending device through an additional peer-to-peer connection;
    determining that a total number of peer devices exceeds a predefined number; and reconfiguring, based upon the determining, each peer-to-peer connection to use a client-server transfer mechanism.

6. The method of claim 2, where
the first information and the second information are collected from a media player runtime environment through an application programming interface (API), the media player runtime environment providing a peer-to-peer connectivity feature through the transport layer network protocol stack, which includes a data prioritization feature that allows prioritization of audio data over video data, the transport layer network protocol stack having an associated audio data buffer and an associated video data buffer, the audio data buffer being separate from the video data buffer, and the produced encoded video data comprises layered video.

7. A non-transitory computer-readable medium encoding a computer program product operable to cause data processing apparatus to perform operations comprising:
collecting periodically in accordance with a first time interval, at a sending device, information including
first information regarding an amount of encoded video data produced by a video encoder, and
second information regarding an amount of encoded video data passed to, but not yet transmitted by, a transport layer network protocol stack;
calculating periodically in accordance with a second time interval, which is different from the first time interval,
from the first information, an intermediate quantity of produced encoded video data, and
from the first information and the second information, a rate of encoded video data transmission by the transport layer network protocol stack; and
when the intermediate quantity compares favorably to a current accumulation of encoded video data in the transport layer network protocol stack,
increasing a current video rate by a rate adjustment amount,
when the rate of encoded video data transmission compares unfavorably to the current video rate,
decreasing the current video rate,
else,
maintaining the current video rate.

8. The non-transitory computer-readable medium of claim 7, where the operations further comprise:
when the current video rate is increased more than once, raising the rate adjustment amount,
when the rate of encoded video data transmission compares unfavorably to the current video rate and the video rate was previously increased,
lowering the rate adjustment amount,
else,
maintaining the rate adjustment amount.

9. The non-transitory computer-readable medium of claim 8, where decreasing the current video rate comprises setting the current video rate to a value under the rate of encoded video data transmission, and where the rate adjustment amount is lowered after the current video rate is decreased.

10. The non-transitory computer-readable medium of claim 8, where the second time interval is at least five times longer than the first time interval, the current video rate is a current video bit rate, and the intermediate quantity is a moving average of the produced encoded video data.

11. The non-transitory computer-readable medium of claim 8, where the transport layer network protocol stack conforms to a transport layer network protocol including a peer-to-peer connectivity feature, and where the operations further comprise:
opening a peer-to-peer connection between the sending device and a first peer device, the peer-to-peer connection allowing a real-time video collaboration between the sending device and the first peer device;
adding one or more additional peer devices to the real-time video collaboration, each additional peer device communicating with the sending device through an additional peer-to-peer connection;
determining that a total number of peer devices exceeds a predefined number; and
reconfiguring, based upon the determining, each peer-to-peer connection to use a client-server transfer mechanism.

12. The non-transitory computer-readable of claim 8, where the first information and the second information are collected from a media player runtime environment through an application programming interface (API), the media player runtime environment providing a peer-to-peer connectivity feature through the transport layer network protocol stack, which includes a data prioritization feature that allows prioritization of audio data over video data, the transport layer network protocol stack having an associated audio data buffer and an associated video data buffer, the audio data buffer being separate from the video data buffer, and the produced encoded video data comprises layered video.

13. A system comprising:
an interface device;
a network connection; and
a computer coupled with the interface device and the network connection and programmed with a runtime environment comprising a media encoder, an audio data buffer and an video data buffer, the audio data buffer being separate from the video data buffer, and the runtime environment is configured to enhance transmitted media quality based on input received in response to output provided regarding an amount of encoded video data produced by the media encoder and regarding an amount of encoded video data passed to the video data buffer but not yet transmitted;
a traffic optimization framework configured to periodically collect, in accordance with a first time interval, the amount of encoded video data produced by the media encoder and the amount of encoded video data passed to the video data buffer but not yet transmitted, the traffic optimization framework determining a rate adjustment amount used to enhance transmitted media quality, where the determining comprises:
periodically calculating, in accordance with a second time interval,
from the amount of encoded video data produced by the media encoder, an intermediate quantity of produced encoded video data, and
from the amount of encoded video data produced by the media encoder and the amount of encoded video data passed to the video data buffer but not yet transmitted, a rate of encoded video data transmission from the video buffer,
comparing the intermediate quantity to a current accumulation of encoded video data in the video data buffer, where
when the intermediate quantity compares favorably to the current accumulation of encoded video data in the video data buffer,
increasing a current video rate by the rate adjustment amount, when the rate of encoded video data transmission compares unfavorably to the current video rate,
decreasing the current video rate by the rate adjustment amount,
else,
maintaining the current video rate, and
responsive to a change in the current video rate, providing input to the runtime environment related to the current video rate.

14. The system of claim 13, where
when the current video rate is increased more than once, raising the rate adjustment amount,
when the rate of encoded video data transmission compares unfavorably to the current video rate and the video rate was previously increased,
lowering the rate adjustment amount,
else,
maintaining the rate adjustment amount.

15. The system of claim 13, where decreasing the current video rate comprises setting the current video rate to a value under the rate of encoded video data transmission, and where the rate adjustment is lowered after the current video rate is decreased.

16. The system of claim 13, where
the second time interval is at least five times longer than the first time interval,
the current video rate is a current video bit rate, and
the intermediate quantity is a moving average of the produced encoded video data.

17. The system of claim 13, further comprising:
a transport layer network protocol stack conforming to a transport layer network protocol including a peer-to-peer connectivity feature, the transport layer network protocol stack including the audio data buffer and the video data buffer, and the produced encoded video data comprises layered video, where the runtime environment is further configured to
open a peer-to-peer connection between the system and a first peer device, the peer-to-peer connection allowing a real-time video collaboration between the system and the first peer device;
add one or more additional peer devices to the real-time video collaboration, each additional peer device communicating with the system through an additional peer-to-peer connection;
determine that a total number of peer devices exceeds a predefined number; and
reconfigure, based upon the determining, each peer-to-peer connection to use a client-server transfer mechanism.

18. The system of claim 17, where the transport layer network protocol stack includes a data prioritization feature that allows prioritization of audio data accumulated in the audio data buffer over video data accumulated in the video data buffer.

19. The system of claim 13, where
the traffic optimization framework collects the amount of encoded video data produced by the media encoder and the amount of encoded video data passed to the video data buffer but not yet transmitted through an application programming interface (API) of the runtime environment.

* * * * *

UNITED STATES PATENT AND TRADEMARK OFFICE
CERTIFICATE OF CORRECTION

| | |
|---|---|
| PATENT NO. | : 8,312,164 B2 |
| APPLICATION NO. | : 12/760502 |
| DATED | : November 13, 2012 |
| INVENTOR(S) | : Jozsef Vass |

Page 1 of 1

It is certified that error appears in the above-identified patent and that said Letters Patent is hereby corrected as shown below:

At Column 18 Line 15, which is line 1 of Claim 12, after "readable" insert --medium--.

Signed and Sealed this
Twelfth Day of February, 2013

Teresa Stanek Rea
*Acting Director of the United States Patent and Trademark Office*